May 31, 1955　　S. H. M. DODINGTON　　2,709,805
BEAM CENTER FINDER
Filed Dec. 24, 1949

INVENTOR
SVEN H. M. DODINGTON
BY
ATTORNEY

Patented May 31, 1955

2,709,805

BEAM CENTER FINDER

Sven H. M. Dodington, Nutley, N. J., assignor to International Telephone and Telegraph Corporation, a corporation of Maryland Application December 24, 1949, Serial No. 134,944

12 Claims. (Cl. 343—16)

This invention relates to arrangements for determining the reception of given portions of a moving radiant energy beam and particularly to beam center finder systems.

Various systems of radio direction finding have been proposed heretofore of which the well-known "Navar" system may be referred to as an illustration. In such a system the determination of azimuth on an aircraft, for example, is effected by comparing the relative phases of a received omni-directional "north" pulse and a received rotating or sweeping beacon or radar beam. The accuracy of the azimuthal indication is a function of the relative width of the radar beam as compared with the duration of the "north" pulse. Since the radar beam is of considerable width, it is necessary to compare the "north" pulse with the actual center of the radar beam. In other applications of moving radio beams it is also necessary or advisable to be able to select and utilize the center portion of the beam for indication or control purposes. The present invention provides arrangements for achieving that objective in a simple, accurate, and readily controllable manner.

Accordingly, one of the principal objects of this invention is to provide an improved arrangement for selecting and utilizing the center portion of a received moving radar beam to overcome the undesirable effects of the width of a radar beam.

A feature of the invention relates to a novel comparison circuit for determining the maximum energy transmission point received of a radio beam such as a periodic, moving radar beam.

Another feature relates to a novel comparison and signal combining circuit employing a cyclically operating device such as a multivibrator synchronized with a rotating pulsed radar beam to control a periodically reversing switch such as a polarized relay. Both the multivibrator and the switch, mutually control a pulse integrating circuit, so that the indication control pulse occurs at the exact center of the received radar pulse beam envelope.

Another feature relates to an improved electronic circuit organization for automatically determining and utilizing the center of a received radio beam such for example as transmitted from a remote station for controlling the operation of a transponder.

The above mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic circuit diagram of an airborne radio transponder according to the invention shown in association with a diagrammatic illustration of a P. P. I. radar or beacon system;

Figures 1, 7:
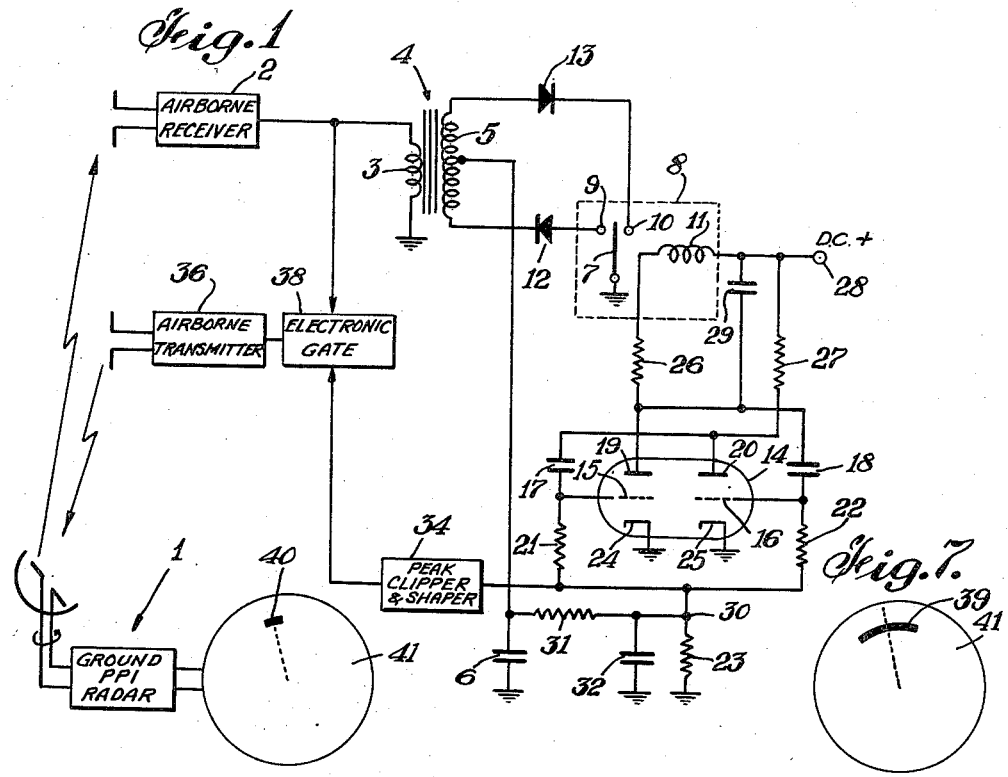
Figure 2:
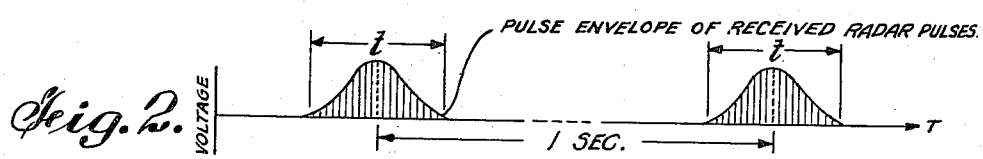
Fig. 2 is a graph of a typical radar pulse envelope.
Figure 6:
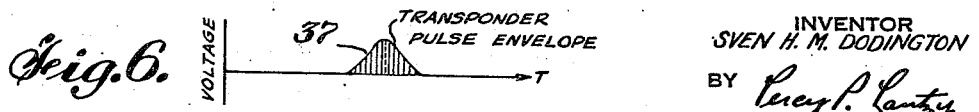

Fig. 6 is a graph of the responder pulse envelope corresponding to the center portion of the pulse of Fig. 2; and Fig. 7 shows the oscilloscope indication of a ground P. P. I. radar before the use of this invention.

While the invention will be described in connection with a "Navar" system, it will be understood that it is capable of use with any other well-known automatic direction finding and beacon system employing a radio beam.

As pointed out above, in the "Navar" system, the transmitted omni-directional "north" pulse can be made quite short in duration, for example in the order of a millisecond; the transmitted moving radar beam however has a width which is dependent in addition to several factors, on the dimensions of the radar antenna and the distance of a transponder from the beacon station. The width of the received portion of the beam accordingly may be somewhere in the order of two to ten degrees or more.

There is shown in Fig. 2 the approximate shape of the envelope of the incoming pulse energy from the radar beam, plotted against time as the beam sweeps laterally past a receiver. If the transmitted radar beam rotates at one revolution per second, it will be observed that the radar energy transmitted in a given direction appears in the form of a pulse envelope of a substantial time base "$t$." It becomes necessary, therefore, to provide means for determining and utilizing only the actual center of the pulse envelope. A transponder for accomplishing this, is shown in Fig. 1.

Referring to Fig. 1, the incoming radar signal transmitted from a beacon station 1 is indicated as received by an aircraft receiver 2. The received signal is applied to the primary winding 3 of a coupling transformer 4. The electrical center of the secondary winding 5 is connected to an integrating circuit which includes condenser 6. However the radar pulse energy does not flow into or out of the condenser 6, until the grounded armature 7 of a neutral polarized relay 8 closes with either of its stationary contacts 9, 10. The relay winding 11 is arranged to be energized in synchronism with the rotation of the radar antenna. Thus, if the said antenna rotates at one revolution per second as stated above, the armature 7 moves back and forth between its stationary contacts also once per second. The contact 9 is connected through a negative half-wave rectifier 12 to one end of winding 5. Likewise the contact 10 is connected through a positive half-wave rectifier 13 to the opposite end of winding 5. The condenser 6 therefor receives an average charge that is either positive or negative depending upon the phase of the armature 7 with respect to the center of the received radar pulse envelope.

Figure 3:
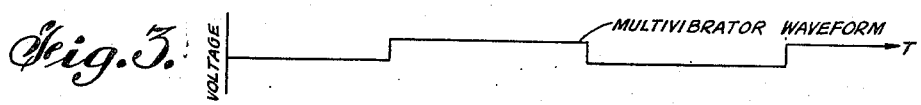
Fig. 3 is a graph of a multivibrator wave form which cooperates with the radar pulse.

Preferably, the relay winding 11 is controlled by a free-running balanced multivibrator or similar oscillator of any well known kind having a symmetrical wave form such as indicated in Fig. 3, and so arranged that it normally runs at approximately the same frequency as the radar antenna rotation. It may comprise for example, a dual triode 14 with the control grids 15, 16, connected in the conventional way through feed-back condensers 17, 18, to respective plate electrodes 19, 20. The grids are likewise connected through respective resistors 21, 22, to ground through a common resistor 23. The cathode 24 and 25 can be directly grounded and the plate electrodes or anodes 19, 20 are connected through the respective plate load resistors 26, 27, to the positive terminal 28 of the usual D. C. plate power supply.

It will be observed that the relay winding 11 is connected in series with the plate 19 and resistor 26, and a suitable by-pass condenser 29 is provided across the winding 11 and resistor 26, so that winding 11 is energized substantially only by the rising and falling of the D. C. potentials occurring at the plate 19. Thus, during the positive potential phase of the plate 19, winding 11 operates the armature 7 to close with contact 9. During the negative potential phase of plate 19, the winding 11 operates the armature 7 to close with contact 10.

By the well-known action of multivibrators, the mean generated frequency of the multivibrator will be effected by the D. C. potential at the point 30. For this purpose, the integrating condenser 6 is connected to point 30 through a suitable filter and integrating circuit comprising resistor 31 and shunt condenser 32, so that point 30 varies in D. C. voltage at the same rate as the change in the average charge on condenser 6.

From the foregoing it will be seen that the condenser 6 receives an average charge that is either negative or positive with respect to a predetermined value, and depending upon the phase of the multivibrator with respect to the center of the radar pulse envelope. Consequently the voltage on condenser 6, after passing through the filter-integrator 31—32, is fed to the grids 15, 16, of the multivibrator in such a way as to increase the mean frequency of the multivibrator.

The net result of the foregoing is that after a few cycles of operation, the multivibrator operates at a speed equal to that of the rotating radar beam and at such a phase that the relay armature 7 changes over at approximately the center of the received radar pulse envelope, sending half the radar pulses into one rectifier, for example rectifier 12, and the other half of the pulses into the other rectifier 13.

If the free-running speed of the multivibrator is normally exactly equal to the radar antenna rotational speed, the exact center point of the radar beam will be found at the time the armature 7 changes over. From the foregoing description it will be clear however that if the free-running speed of the multivibrator differs from that of the radar antenna, it will be necessary for the relay armature 7 to operate in such a way that slightly more energy is fed into one rectifier than into the other, in order that a steady D. C. correcting voltage may be generated at the point 30. Any error due to this factor can be reduced by using a large ratio of incoming radar signal with respect to the control voltage applied to grids 15, 16. Thus a very small displacement from the center of the beam will provide sufficient correction voltage to bring the multivibrator into synchronism.

Figure 4:
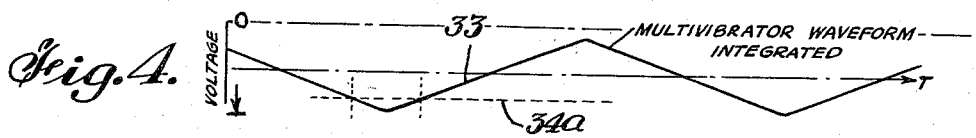
Fig. 4 is a graph of the integrated multivibrator wave form of Fig. 3.
Figure 5:
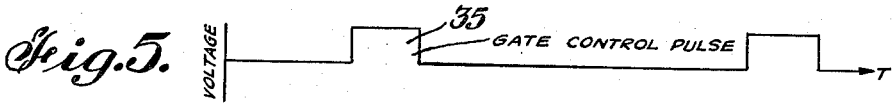
Fig. 5 is a graph of the pulse form produced by clipping and shaping the peaks of the wave shown in Fig. 4.

Fig. 4 shows the multivibrator wave form of Fig. 3 in integrated form. The integrated multivibrator wave form 33 is applied to a known peak clipper and shaper circuit 34 which by clipping as indicated at 34a and shaping produces a control signal 35 such as illustrated in Fig. 5. This signal may be applied to trigger an airborne transmitter 36 for transmission of a transponder pulse 37 which in turn is received at the beacon station 1 on the ground. As shown in Fig. 1, the pulse 35 is applied from the peak clipper and shaper 34 to an electronic gate 38 to generate a gating voltage for controlling the passage of incoming signal from receiver 2 thus allowing to pass only the middle portion of the beam received. This gated signal is applied to the airborne transmitter 36 to give a shorter transmission than that received thus changing the appearance of the ground P. P. I. oscilloscope indication 39 from that shown in Fig. 7, to the indication 40 shown in Fig. 1. Ordinarily, the width of the radar beam received by the receiver in the aircraft determines the length of time that the airborne transmitter operates and consequently the length of signal 39 appearing on the radar oscilloscope screen 41, Fig. 7. By modulating the airborne transmitter 36 with the wave 35 a transponder signal envelope is produced which corresponds to the center portion only of the received radar beam. The transponder signal received at the beacon station 1 thus produces a much shorter arcuate indication 40 on the oscilloscope screen 41, Fig. 1.

In addition to utilizing the pulse 35 for triggering the transmitter, the pulse may be applied to an azimuth indicator used in Navar systems for comparison with the "north" pulse. Where such an azimuth indicator is used on the aircraft, the multivibrator and relay of Fig. 1 may be replaced by a commutator on the shaft of the azimuth indicater which rotates once a second in synchronism with the radar beam. This commutator would then perform the switching operation otherwise performed by the multivibrator and relay.

While I have described above the principles of my invention in connection with specific apparatus, it is to be clearly understood that this description is made only by way of example and not as a limitation to the scope of my invention.

I claim:

1. A system for determining the inflection point of periodic electrical energy waves having rising and falling portions, comprising switching means for separating the positive and negative signal portions of said wave in accordance with the energy content thereof, a source of recurrent switching signals to control said switching means, means for controlling the frequency of said switching signals in accordance with the relative amplitudes of said positive and negative signal portions, output means for said portions and means for controlling the relative time duration of said portions passing through said output means in accordance with said switching signals.

2. A system at a given station for determining the center of an energy wave derived from the rising and falling of signal reception of a radio beam periodically swept laterally past the station, comprising an oscillator, switching means controlled by the cyclic operation of said oscillator to separate into two wave portions the energy of said received radio beam signal, and oscillator control means coupled between the output of said switching means and said oscillator, said oscillator control means being responsive to said two wave portions for phase control of the cyclic operation of said oscillator to obtain steady state operation when the energy content of said two portions are substantially equal.

3. A system according to claim 2 in which said oscillator is of the multivibrator type.

4. A system according to claim 2 in which said oscillator is a multivibrator and said oscillator control means includes a pulse integrating circuit which is jointly controlled by said oscillator and by the phase of said control signals with respect to the phase of said oscillator output.

5. A system according to claim 2 in which said signal deriving means produces signals of positive and negative voltage respectively from said two wave portions.

6. A radio-controlled orientation system according to claim 5 in which said oscillator is a multivibrator and said oscillator control means includes a pulse integrating circuit which is jointly controlled by said multivibrator and by the relative amplitudes of said signals with respect to the operating phase of the multivibrator, said multivibrator having its constants proportioned so that its mean operating frequency is substantially synchronized with the recurrency rate of said radio beam sweeping past said station.

7. In combination, means to receive a radar pulse signal as it is scanned at a given rate laterally past the receiving point and means to select and utilize only the center portion of the pulse envelope of said radar pulse signal for indication purposes, the last-mentioned means comprising a pulse integrator connected in circuit with the output of said receiving means, a regularly operating switch for closing the circuit of said integrator for passage thereto of energy of a series of radar pulses, an oscillator, and means connecting said integrator circuit to said oscillator to automatically control the mean frequency of said oscillator, said oscillator being disposed to control operation of said switch at an average periodicity determined by the relative timing of the center portions of the envelopes of said radar pulse signals and the mean frequency of said oscillator.

8. In combination, a pair of reversal poled rectifiers, means to apply periodically received radar pulses to said rectifiers for full-wave rectification, a common return circuit for said rectifiers including a reversing switch and a pulse integrating device, an oscillator for operating said switch said oscillator being synchronized with the periodically received radar pulses, and circuit connections for causing said integrating device to control the mean frequency of said oscillator to produce a signal corresponding to the center portion of the periodically received radar pulses.

9. The combination according to claim 8 in which said switch is a polarized relay and said oscillator is a multivibrator, said relay having its operating winding connected in the plate circuit of said multivibrator.

10. A system of the character described comprising means to receive radar pulses, a pair of oppositely poled rectifiers, an input impedance having its opposite ends connected to said rectifiers for full-wave rectification, a relay having a pair of fixed contacts connected respectively to said rectifiers said relay having an armature connected to the mid-point of said impedance through a pulse integrating circuit, a multivibrator, said relay having its operating winding connected to the plate circuit of said multivibrator, and means connecting said integrating device to the control-grids of said multivibrator to maintain said multivibrator synchronized with the center portion of the received radar pulse.

11. A system for transmitting a responder signal in response to the sweeping of a radar beam of pulses laterally past the location of such system, comprising a receiver to produce a pulse envelope each time said beam of pulses sweeps past the receiver, means for producing a narrow pulse of energy corresponding in time to the center portion of said pulse envelope, said means including an oscillator, a switching circuit controlled by the cyclic operation of said oscillator to separate the received pulse envelope into two portions, means responsive to said two portions to phase said oscillator to obtain a cyclic steady state operation when the energy content of said two portions are substantially equal, means to integrate the output of said oscillator to obtain a waveform having peaks corresponding to the center of said pulse envelope, and means to clip and shape the peak portion of the integrated waveform.

12. Means for determining the maximum peak energy of a series of received radar signals periodically scanned laterally past a receiving point, receiver means at said point to detect said radar signals, an oscillator, means coupled to the output of said receiver means and under control of said oscillator to produce polarized energy signals in accordance with the rising and falling amplitude portions of the envelope of said detected radar signals, an integrating circuit, means to apply said polarized energy signals to said integrating circuit, and means coupling said integrating circuit to said oscillator to control the phase of operation thereof.

References Cited in the file of this patent
UNITED STATES PATENTS

| | | |
|---|---|---|
| 2,252,083 | Luck | Aug. 12, 1941 |
| 2,433,667 | Hollingsworth | Dec. 30, 1947 |
| 2,444,445 | Isbister | July 6, 1948 |
| 2,448,016 | Busignies | Aug. 31, 1948 |
| 2,455,265 | Norgaard | Nov. 30, 1948 |
| 2,467,208 | Hahn | Apr. 12, 1949 |
| 2,492,137 | Dodington | Dec. 27, 1949 |
| 2,520,600 | Jones | Aug. 29, 1950 |
| 2,546,370 | Ostendorf, Jr. et al. | Mar. 27, 1951 |
| 2,557,869 | Gloess | June 19, 1951 |